| United States Patent [19] | [11] Patent Number: 4,908,230 |
| Miller | [45] Date of Patent: Mar. 13, 1990 |

[54] PROCESS FOR COATING POLYCARBONATES WITH UV CURABLE COATINGS

[75] Inventor: Joseph E. Miller, Homewood, Ill.

[73] Assignee: The Sherwin-Williams Company, Cleveland, Ohio

[21] Appl. No.: 289,655

[22] Filed: Dec. 22, 1988

[51] Int. Cl.$^4$ .............................................. B05D 3/06
[52] U.S. Cl. .................................... 427/54.1; 427/161; 427/164
[58] Field of Search ........................ 427/54.1, 161, 164

[56] References Cited

U.S. PATENT DOCUMENTS

| 2,159,151 | 5/1939 | Hershberger | 427/161 |
| 2,636,833 | 4/1953 | Borden, Jr. | 427/161 |

FOREIGN PATENT DOCUMENTS 53-28588  3/1978  Japan.

OTHER PUBLICATIONS

"Factors Influencing the Adhesion Properties of Radiation Curable Coatings on Different Substrates", by Priola, Gozzelino and Ferrero, *Proceedings of the XIII International Conference in Organic Coatings Science and Technology*, Athens, Greece, Jul. 7–11, 1987, pp. 303–318.

*Primary Examiner*—Stanley Silverman
*Attorney, Agent, or Firm*—Steven W. Tan; Robert E. McDonald

[57] ABSTRACT

A process for coating polycarbonate substrates with UV curable coatings comprising cooling the UV curable coating to a temperature of below 40° F., maintaining the dew point of the surrounding atmosphere such that essentially no moisture condenses on the substrate, applying the cooled coating to the substrate and curing the coating to the substrate with ultraviolet radiation.

7 Claims, No Drawings

PROCESS FOR COATING POLYCARBONATES WITH UV CURABLE COATINGS

BACKGROUND OF THE INVENTION

The use of ultraviolet (UV) curable coatings on polycarbonate substrates is desirable due to the advantage of being able to cure the coating to the substrate in a minimum amount of time without the need for heat which could destroy the substrate. To obtain superior adhesion between the UV coating and the substrate, the proper selection of monomers in the coating composition is critical.

The best coating-substrate adhesion is experienced when utilizing coatings containing so-called "interacting" monomers, that is, monomers which are reactive with the polycarbonate substrate. UV curable coatings which contain interacting monomers exhibit much better adhesion to polycarbonate substrates than UV curable coatings which contain non-reactive, or so-called "noninteracting" monomers.

Priola et al. suggest that the production of a haze, or opacity, upon curing indicates that the coating and the substrate have interacted to form a good, adhesive bond. They found a correlation between opacity and the use of the interacting monomers. Consequently, they suggest that to obtain good adhesion between the UV curable coating and the polycarbonate substrate one should select interacting monomers for use in one's UV curable coating composition. However, the very formation of the haze or opacity is a major problem associated with the use of interacting monomers in UV curable coatings compositions. The presence of a haze or opacity in the coating composition detracts from its visual appearance and appeal. Consequently, the dilemma becomes how to obtain good adhesion between UV coating compositions and polycarbonate substrates without producing the undesirable haze or opacity associated with the interacting monomers.

SUMMARY OF THE INVENTION

The present invention relates to a process for coating polycarbonate substrates with UV curable coating compositions having interacting monomers, which process comprises:

(a) cooling said UV curable coating composition, and optionally, said polycarbonate substrate, to a temperature below at least about 40° F. while maintaining the dew point of the surrounding atmosphere such that essentially no moisture condenses onto the surface of said polycarbonate substrate prior to pouring;

(b) applying said cooled coating composition to the surface of said polycarbonate substrate; and (c) subjecting said coating/substrate combination to an amount of ultraviolet radiation sufficient to cure said coating.

Accordingly, it is an object of this invention to teach a process for producing polycarbonate substrates which have been coated with UV curable coating compositions.

It is another object of this invention to teach a process for coating polycarbonate substrates using coating compositions which contain interacting monomers without producing undesirable hazing or opacity in said coating.

These and other objects will become readily apparent from the detailed description which follows below.

DETAILED DESCRIPTION OF THE INVENTION

1. Coating Compositions

In general, any conventional UV curable coating composition, whether or not it exhibits hazing or opacity when applied to a polycarbonate substrate can benefit from the present invention. In specific, those UV curable coating compositions which contain interacting monomers tend to have noticeable hazing when applied to a polycarbonate substrate. It is these coating compositions which benefit the most from the present invention.

The term "interacting monomers" as used herein refers to those monomers which when placed in contact with a polycarbonate substrate have a tendency to dissolve, diffuse into, or otherwise chemically react with the substrate. To test whether a monomer is interacting or not, a drop of the monomer can be placed in contact with a polycarbonate sheet for a period of two minutes at a temperature of between about 65° F. and about 80° F. At the end of the two-minute period, excess monomer is removed by rinsing the polycarbonate sheet with ethanol. If opacity or hazing is observed on the sheet, the monomer is deemed to be interacting. If no opacity or hazing is observed on the sheet, the monomer is deemed to be non-interacting.

It is not necessary to separate monomers to determine if each is interacting. Rather, the same procedure can be followed for a complete coating composition if one wishes to determine whether or not that coating is interacting.

One area in which the present invention is useful is in improving the adhesion of non-interacting, non-hazing resins by addition of interacting resins to the coating composition. For example, bisphenol A diglycidyl ether diacrylate (BGEDA) resin, a typical UV curable resin, has been determined by Priola et al. to be non-interacting with polycarbonate substrates in and of itself. Consequently, its adhesion to polycarbonate substrates could be improved. Priola et al. found that certain combinations of BGEDA and other monomers have been determined to be interacting, and these combinations adhere to polycarbonate substrates better than BGEDA alone. However, each of these combinations experiences hazing or opacity when placed on a polycarbonate substrate.

Use of the present invention does not prevent the coating composition from interacting with the polycarbonate substrate to form superior adhesion while curing. The present invention does prevent the formulation of a haze or opacity during the interaction. The result is a coating which exhibits good adhesion to the polycarbonate substrate without exhibiting haze or opacity which clouds the surface of the sheet.

2. Preferred Coating Compositions

Coating compositions of particular interest to this invention comprise interacting monomers selected from the group consisting of N-vinyl pyrrolidone, butyl acrylate, ethyl methacrylate, 2ethoxyethyl methacrylate, ethyl maleate, vinyl benzoate, allyl maleate, butanediol diacrylate, hexanediol diacrylate, diethylene glycol diacrylate and mixtures thereof. In addition, the coating compositions can comprise non-interacting monomers, such as 2ethylhexyl acrylate, hydroxy ethyl acrylate, hydroxyl propyl acrylate, hydroxy ethyl methacrylate, hydroxy propyl methacrylate, polyethylene glycol diacrylate, trimethylolpropane trimethacrylate, trimethylolpropane triacrylate, pentaerythritol triacrylate, pentaerythritol tetracrylate, and combinations thereof. Coating compositions of this invention can further comprise solvents such as alcohols and glycol ethers, and free radical photo initiators.

One particularly preferred composition of interest to this invention is a coating comprising at least one interacting monomer, preferably diethylene glycol diacrylate, at least one noninteracting monomer, preferably trimethylolpropane triacrylate, methanol, and a photoinitiator such as an aromatic hydroxy ketone, preferably 2-hydroxy-2-methyl-1-phenylpropane-1-one, tradenamed Darocur 1173, available from EM Industries, Inc. of Hawthorne, NY.

3. Substrates

The term "polycarbonate substrates" as used herein generally refers to aromatic carbonate polymers such as LEXAN®, available from the General Electric Company or MAKROLON®, available from Mobay Corporation. Polycarbonate substrates are well known in the art, and can be produced as described in U.S. Pat. No. 3,989,672, incorporated herein by reference.

4. Application Of The Coating To The Substrate

Typically, the UV curable coating can be applied to the substrate in one of several different ways. One method is to immerse and withdraw the substrate in a bath of coating. Another method of applying coating to substrate is to spray the coating onto the surface of the substrate. Yet another possibility is to brush the coating onto the surface of the substrate. Preferably, the substrate is immersed in a bath of coating.

5. Cooling

Key to the success of the present invention is the requirement that the coating both be cooled to a temperature below at least about 40° F. prior to contacting it with the substrate, preferably below at least about 30° F. This temperature should be maintained at least until the beginning of the UV curing steps, and is preferably maintained, or substantially maintained, until the coating is cured.

Optionally, and preferably, the substrate can also be cooled. The temperature of the substrate can be as low as about 30° F, but preferably should not be below the dew point temperature of the surrounding atmosphere. In any event, the temperature of the substrate should not be above about 70° F, preferably about 60° F. and should not be below about 30° F., preferably 40° F.

In addition to cooling the temperature of the coating, it is essential to maintain the dew point of the atmosphere surrounding the bath such that essentially no moisture condenses onto the coated substrate prior to curing.

One means for preventing condensation of moisture onto the substrate is to maintain the dew point of the atmosphere below the temperature of the bath. The exact dew point temperature can vary depending on the bath temperature, the substrate temperature and the amount and type of alcohol used in the bath. For example, if the bath is maintained at a temperature of about 40° F. while the substrate is at about 60° F., condensation can be prevented by maintaining the dew point temperature of the atmosphere at least about 10° F., preferably about 15° F. below the bath temperature. At 40°F, the alcohol in the bath, through an evaporative cooling effect, actually lowers the bath surface temperature below 40° F. If the dew point were above or very near 40° F., the possibility of condensation would be high.

When the bath temperature is lower, about 5° F., the dew point of the atmosphere need only be lower than the substrate temperature. The amount of condensation on the surface of the coated substrate is not significant because the substrate warms the coating to a point above the dew point and the condensed moisture evaporates off the surface of the substrate.

6. UV Curing Conditions

To cure the coating to the substrate, it is necessary to expose the coated substrate to an ultraviolet light source for a suitable time period. As the coated substrate is exposed to the light source, the coating cures onto the substrate. The reduced temperature of the coating, and optionally the substrate, prevent the haze attack that normally occurs between interactive monomers and polycarbonate substrates.

Ultraviolet curing methods are well known in the art, and specific curing equipment, lamps, conveyors, and the like, are not of import to this invention. Any acceptable ultraviolet curing method benefits from this invention.

In testing this invention, the substrate was coated, and allowed to sit for a given period of time, after which it was passed beneath two 300 WPI medium pressure mercury lamps placed at a distance of about two inches from the coated substrate. The degree of haze attack was evaluated for that substrate an time period. Identical substrates were allowed to sit for different time periods prior to curing. Examples 1–3 show the correlation between temperature of the coating solution and degree of haze over the range of time periods. It is clear from the examples that the lower the solution temperature, the less haze the polycarbonate substrate experiences.

EXAMPLES

EXAMPLE 1

Several identical polycarbonate substrates at room temperature were coated with a composition of 80% diethylene glycol diacrylate and 20% trimethylolpropane triacrylate at 75% volume solids in methanol. The temperature of the coating composition was about 70° F. and the dew point temperature was maintained at about 30° F. The total time to immerse and withdraw each substrate was about 26 seconds. Each coated substrate then sat for a different time period as shown in Table 1, after which it was passed under two 300 WPI medium pressure mercury lamps at a distance from the substrate of about 2 inches for curing the coating to the substrate. Once cured, the degree of haze was evaluated, with a value of "10" being the least amount of haze and a value of "0" being the most haze.

TABLE 1

| Substrate # | Time Interval | Degree of Haze |
|---|---|---|
| 1 | 20 seconds | 9 |
| 2 | 35 seconds | 6 |
| 3 | 65 seconds | 5 |
| 4 | 95 seconds | 3 |

EXAMPLE 2

The same procedure as in Example 1 was performed with the exception that the coating bath temperature was about 44° F. and the dew point was maintained at about 30° F. Table 2 shows the degree of haze for each substrate.

TABLE 2

| Substrate # | Time Interval | Degree of Haze |
|---|---|---|
| 5 | 20 seconds | none |
| 6 | 35 seconds | 10 |
| 7 | 65 seconds | 9 |
| 8 | 95 seconds | 5 |

EXAMPLE 3

The same procedure as in Examples 1 and 2 was performed with the exception that the coating solution temperature was about 3° F. Dew point was not maintained, but was measured at about 36° F. Table 3 shows the degree of haze for each substrate.

TABLE 3

| Substrate # | Time Interval | Degree of Haze |
|---|---|---|
| 9 | 20 seconds | 10 |
| 10 | 35 seconds | 10 |
| 11 | 65 seconds | 9.5 |
| 12 | 95 seconds | 9.5 |

What is claimed is:

1. A process for coating polycarbonate substrates with ultraviolet radiation (UV) curable coating compositions comprising:
   (a) cooling said UV curable coating composition to a temperature below at least about 40° F. while maintaining the dew point of the surrounding atmosphere such that essentially no moisture condenses on said polycarbonate substrate;
   (b) applying said cooled coating composition to the surface of said polycarbonate substrate; and
   (c) subjecting said coated substrate to an amount of ultra-violet radiation sufficient to cure said coating.

2. The process of claim 1 wherein said polycarbonate substrate is maintained at a temperature below at least about 70° F. but above a temperature of at least about 30° F.

3. The process of claim 2 wherein said coating composition is cooled to a temperature below at least about 40° F., said polycarbonate substrate is cooled to a temperature of about 40° F. and the dew point of the surrounding atmosphere is maintained at least about 10° F. below the temperature of the coating composition.

4. The process of claim 1 wherein the dew point of the surrounding atmosphere is maintained at least about 10° F. below that of said coating composition.

5. The process of claim 1 wherein said coating composition is cooled to a temperature below about 10° F., and the dew point of the surrounding atmosphere is maintained below the temperature of said substrate.

6. The process of claim 1 wherein said coating composition comprises at least one interacting monomer selected from the group consisting of N-vinyl pyrrolidone, butyl acrylate, ethyl methacrylate, 2-ethoxyethyl methacrylate, ethyl maleate, vinyl benzoate, allyl maleate, butanediol diacrylate, hexanediol diacrylate, diethylene glycol diacrylate and mixtures thereof.

7. The process of claim 6 further comprising at least one non-interacting monomer selected from the group consisting of 2-ethylhexyl acrylate, hydroxy ethyl acrylate, hydroxyl propyl acrylate, hydroxy ethyl methacrylate, hydroxy propyl methacrylate, polyethylene glycol diacrylate, trimethylolpropane trimethacrylate, trimethylolpropane triacrylate, pentaerythritol triacrylate, pentaerythritol tetracrylate, and mixtures thereof.

* * * * *